J. C. HENDERSON.

Cooking Stove.

No. 2,458. Reissued Jan. 15, 1867.

Witnesses
Charles D. Cellum
R. A. Baille

Inventor
J. C. Henderson

N. PETERS. Photo-Lithographer, Washington, D. C.

United States Patent Office.

JOSEPH C. HENDERSON, OF ALBANY, NEW YORK.

*Letters Patent No.* 28,482 *dated May* 29, 1860; *reissue No.* 1,506, *dated June* 30, 1863; *reissue No.* 2,458, *dated January* 15, 1867.

IMPROVEMENT IN COOKING STOVES.

The Schedule referred to in these Letters Patent and making part of the same.

TO ALL WHOM IT MAY CONCERN:

Be it known that I, JOSEPH C. HENDERSON, of the city and county of Albany, and State of New York, have heretofore invented certain new and useful improvements in "Stoves," upon which Letters Patent of the United States of America were granted to me, bearing date the 29th day of May, A. D. 1860, and which said Letters Patent were on or about the 30th day of June, A. D. 1863, duly surrendered and reissued on an amended specification in one division or patent; and I do hereby declare that the following is a full, clear, and exact description of the nature, construction, and mode or manner of the use and operation of that part of my invention relating to "Cooking Stoves or Furnaces," reference being hereby had to the accompanying drawings, which make a part of this my new, corrected, and amended specification; and I do now surrender the said Letters Patent, in order that the invention and improvements aforesaid may herein be divided and be more fully specified, described, and set forth, and by such divided, amended, and corrected specifications, claims, and drawings, my rights thereto and therein shall be more fully and permanently protected, as by law provided.

Like letters represent and refer to like or corresponding parts.

The object of my invention is to overcome the principal objection to the use of soft or bituminous coal in stoves or furnaces, and to prevent smoking or filling up of the flues, and to make a more perfect combustion of the smoke and gases arising therefrom.

The nature of my invention consists in the employment of a coal or supply-chamber separate from the combustion-chamber of the stove or furnace, and so constructed that the gaseous matter from the fresh coal in the supply-chamber must pass into, through, or over the burning fuel in the combustion-chamber and thereby be consumed, substantially as hereinafter stated and set forth. It also consists in the employment of a combustion-chamber contracted at the top in order to retain the gases evolved from the fuel until they are completely consumed, or nearly so, substantially as hereinafter specified and set forth. It also consists in the employment of a division plate between the supply and combustion-chambers, through which air may be introduced to the fire to promote a more perfect combustion, as hereinafter specified and set forth. It also consists in constructing the plate which forms the side of the combustion-chamber opposite said division plate in such a manner that air may be introduced through it into the fire, substantially as hereinafter specified.

Figure 1:
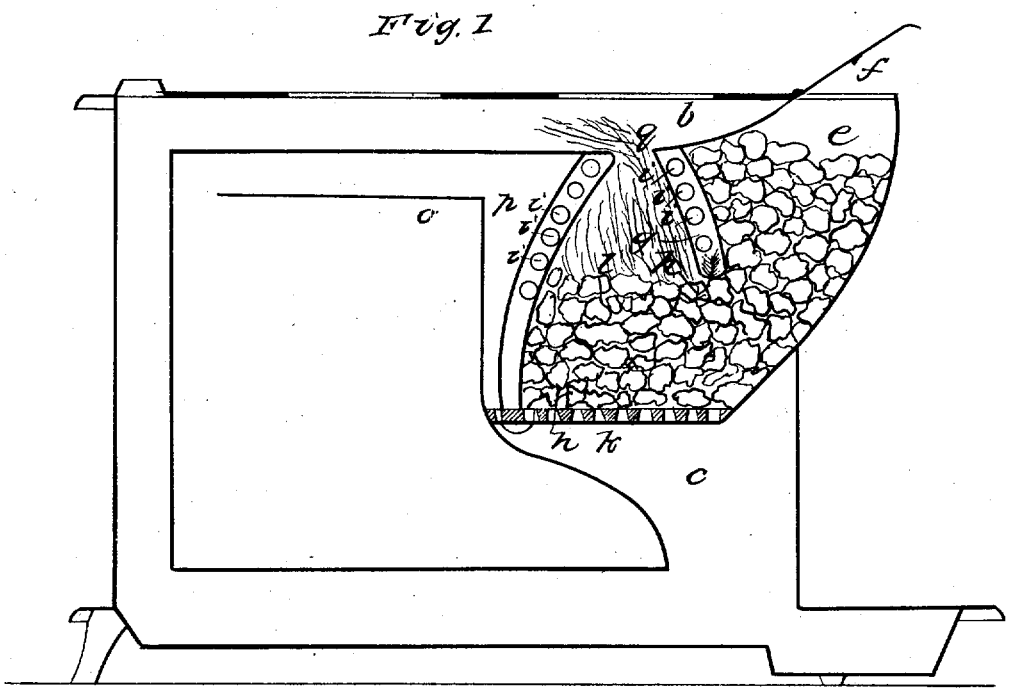
Figure 1 is a vertical section of a stove containing my said invention and improvements, each being fully hereinafter described and set forth.
Figure 2:
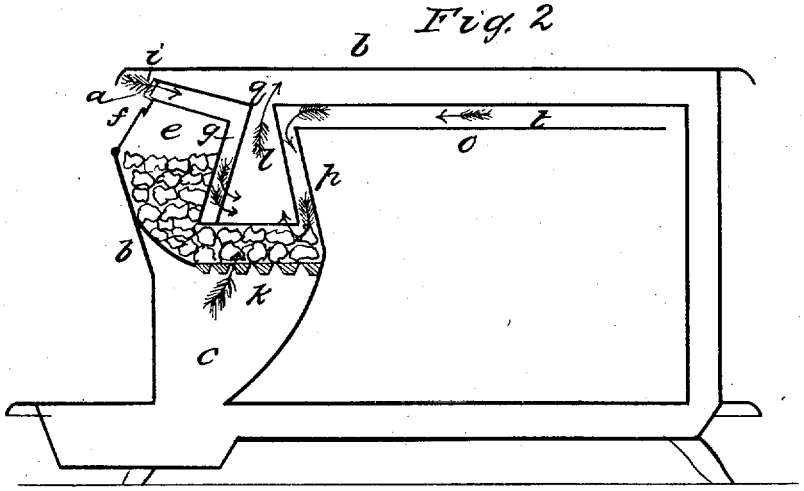
Figure 2 is another vertical section, showing a modification of same invention, more fully hereinafter described.

Having thus described the nature of my said invention, and to enable others skilled in the art to which it relates to make and use the same, I will here proceed to describe the construction and operation thereof, which is as follows, to wit:

*e*, figs. 1 and 2, represents a coal-supply chamber, and *l* a combustion-chamber, which chambers are separated from each other by the division plate or partition, *g*. At the bottom of the combustion-chamber is the grate *k*, through which air is supplied to the fire. The coal may be placed in the supply-chamber through an opening in the top of the stove, as in fig. 1, by raising the lid *f*, or as at *f*, fig. 2, through an opening in front of the stove. The partition, or division plate *g* is constructed hollow, with openings at *h*, to admit air to the surface of the fire. The combustion-chamber *l* is contracted at the top for the purpose of preventing the too free escape of the gases of combustion. This narrow top or throat is formed by the employment of the plate *p*, which is also constructed hollow, with apertures, *h*, for the admission of air to the surface of the fire. In fig. 1 the air is admitted to the interior of the plates *g* and *p*, by apertures in the sides of the stove at *i i*. In fig. 2 the air is admitted to the partition *g*, through the openings *i* in the front of the stove, and to the division plate *p* from the interior of the oven through the passage *t*, thus furnishing air to the fire, and ventilating the oven at the same operation.

In operating a stove or furnace containing my invention, a fire is first built in the combustion-chamber *l*; after it is well started the supply-chamber *e* is filled with fresh coal, and the lid *f* closed. As the fresh coal becomes heated it gives off its volatile portions in the form of gas, which is carried by the draught under the division plate *g*, and into the fire. The throat *q* of the combustion-chamber being narrow, the too rapid escape of the gas is prevented, while the air rushing in from the apertures *h h* in the plates *g* and *p* renders its combustion complete. As the fuel in the combustion-chamber is consumed, the coal in the supply-chamber nearest the fire, and which has parted with nearly all its gaseous products, is pushed on to the grate and fresh coal supplied in its place. By these means nearly all the smoke generated by the fire is consumed, thus and thereby greatly increasing the production of heat and preventing the clogging of the flues and other annoying consequences of leaving the smoke unconsumed from such coals or fuel.

Having thus described the construction and operation of my said invention and improvements, what I claim as my invention, and desire to secure by Letters Patent, is—

1. The employment of a supply-chamber, *e*, separated from the combustion-chamber *l*, by means of the division plate *g*, or any equivalent therefor, and each so arranged that the fresh fuel shall be fed at the side of the burning fuel, in the manner substantially as and for the purposes herein described and set forth.

2. I claim the combustion-chamber *l*, contracted at the top to prevent the too rapid escape of the gases of combustion, in combination with the supply-chamber *e*, substantially in the manner and for the purposes hereinbefore described and set forth.

3. I claim the employment of the division plate or partition *g*, or its equivalent, constructed and arranged as to divide the fire-chamber or chamber of combustion, and thereby constitute the chambers *l* and *e* in the manner and for the purposes substantially as herein described and set forth.

4. I claim so constructing and arranging the said division plate *g*, between said chambers *l* and *e*, that atmospheric air may be admitted into and through it to the fire, so as to more perfectly consume the gases as they are evolved from the burning fuel, in the manner substantially as herein described and set forth.

5. I claim the employment of the plate *p* for the purpose of retaining the gases in contact with the fire until they are entirely consumed, substantially as hereinbefore described and set forth.

6. I claim constructing the said plate *p* in such a manner that air can be introduced through it to the surface of the fire, substantially as and for the purposes hereinbefore specified and set forth.

7. I claim the supply-chamber *e*, combustion-chamber *l*, division plate *g*, and plate *p*, all combined and operating substantially in the manner and for the purposes hereinbefore specified and set forth.

8. I claim the employment of the narrow or contracted throat *q*, when applied to cooking stoves or furnaces in the manner and for the purposes substantially as herein described and set forth.

9. I claim the employment of the supply-chamber *e*, when applied to cooking stoves or furnaces, and therein constructed and arranged immediately in front of the combustion-chamber, substantially in the manner and for the purposes as herein described and set forth.

In testimony whereof I have on this 23d day of May, A. D. 1866, hereunto set my hand.

J. C. HENDERSON.

Witnesses:

CHARLES D. KELLUM,

R. H. REILLE.